United States Patent [19]

Cappuccitti et al.

[11] Patent Number: 5,243,502
[45] Date of Patent: Sep. 7, 1993

[54] HIGH-MOUNTED BRAKE LAMP FOR EASY INSTALLATION

[75] Inventors: Michael R. Cappuccitti, Canton, Mich.; Lawrence D. Kroeger, Crestwood, Ky.

[73] Assignee: Ford Motor Company, Dearborn, Mich.

[21] Appl. No.: 855,996

[22] Filed: Mar. 20, 1992

[51] Int. Cl.⁵ .............................. B60Q 1/26
[52] U.S. Cl. ................... 362/80.1; 362/61; 362/396
[58] Field of Search ............ 362/61, 80.1, 226, 396

[56] References Cited

U.S. PATENT DOCUMENTS

| | | | |
|---|---|---|---|
| 4,285,033 | 8/1981 | Hart | 362/368 X |
| 4,575,782 | 3/1986 | Levin et al. | 362/61 |
| 4,703,398 | 10/1987 | Huth et al. | 362/80.1 |
| 4,734,675 | 3/1988 | Wen | 362/61 |
| 4,831,501 | 5/1989 | Okamoto et al. | 362/61 |
| 4,945,456 | 7/1990 | Kakidaira | 362/80.1 |
| 4,949,071 | 8/1990 | Hutchinson | 362/80.1 |

*Primary Examiner*—Stephen F. Husar
*Attorney, Agent, or Firm*—Roger L. May; Daniel M. Stock

[57] ABSTRACT

A high-mounted brake lamp is provided which can be conveniently installed in a vehicle prior to the installation of the vehicle's rear window and which can be easily and quickly adjusted, without the need for installation tools, to ensure that the brake lamp is firmly secured against the rear window after the rear window has been installed, due to a ratcheting mechanism which allows slidable movement towards the rear window only. In this manner, the brake lamp is firmly locked into the correct position.

9 Claims, 3 Drawing Sheets

HIGH-MOUNTED BRAKE LAMP FOR EASY INSTALLATION

BACKGROUND OF THE INVENTION

The present invention relates to a high-mounted brake lamp and, more particularly, to a high-mounted brake lamp which can be easily and quickly installed in a vehicle prior to the installation of the vehicle's rear window and without the need for installation tools.

In the manufacture of motor vehicles, means are continually sought to improve the speed and reliability of their manufacture. The installation of high-mounted brake lamps in motor vehicles poses a unique problem due to their positioning on the rear or package tray at the junction of the package tray and rear window. Due to the close proximity of the rear window and package tray, little room is left for the assembly worker to install the brake lamp. It is difficult to simultaneously maneuver the lamp and the requisite installation tools into proper installation position to install the brake lamp. Such conditions slow the installation process and may result in improper installation of the brake lamp and/or damage to the rear window. These problems are exacerbated by the current designs of modern vehicles which call for a more steeply sloped rear window which, in turn, increases the acuteness of the angle between the rear window and the package shelf, thereby further decreasing the already limited space available to install the brake lamp.

As is known, it is desirable that light emitted from high-mounted brake lamps not be permitted to escape from the lamp housing and enter the interior of the vehicle. The easiest and most conventional way to ensure that light does not escape from high-mounted brake lamps is to provide a light shield on such lamps and install the lamps with the light shield secured firmly against the rear window. In this manner, substantially all of the light emitted from the brake lamp will be directed through the rear window and almost none will leak into the interior of the vehicle. Heretofore, if the high-mounted brake lamp were installed prior to installation of the rear window, it would be difficult to ensure that the light shield portion of the lamp was always secured firmly against the rear window due to the tolerances which exist in the positioning of the rear window with respect to the package tray.

Accordingly, it is seen that a need exists in the art for a high-mounted brake lamp with a light shield which can be easily installed in a vehicle and which can be quickly adjusted, without the need for installation tools, to ensure that the light shield is firmly secured against the rear window after the rear window has been installed.

SUMMARY OF THE INVENTION

The present invention meets that need by providing a high-mounted brake lamp which can be conveniently installed in a vehicle prior to the installation of the vehicle's rear window and which can be easily and quickly adjusted without the need for installation tools. Further, the brake lamp may be firmly secured against the rear window after the rear window has been installed, due to a ratcheting mechanism which allows slidable movement towards the rear window only. In this manner, the brake lamp is firmly locked into the correct position by a simple push from the installer.

In accordance with one aspect of the present invention, a high-mounted brake lamp is provided for a motor vehicle having a package tray in the interior of the vehicle and a rear window adjacent the package tray. The brake lamp generally comprises a lamp housing containing a light transmissive opening through which a light source can transmit light, the light source being positioned substantially adjacent the opening, a light shield mounted around the opening so as to direct light transmitted from the light source in substantially one direction, and means for rigidly mounting the housing against the package tray of the vehicle in a first position prior to attachment of the rear window to the vehicle. In addition, means are provided for securing the light shield against the rear window after the rear window has been attached to the vehicle, by slidably moving the housing from the first position, towards the rear window, and to a second position where the light shield is placed into contact with the rear window. The securing means generally includes an unidirectional slidable portion for locking the light shield against the rear window. Preferably, the unidirectional slidable portion of the securing means comprises a ratchet mechanism.

Preferably, the mounting means comprise a pair of channel members mounted to the package tray, the channel members having an internal channel with a first set of slanted teeth disposed inside of the internal channel. Further, the securing means preferably comprise a pair of slidable members, the slidable members having a first portion secured to the housing, and a second portion adapted to slide within the internal channel of the channel members, the second portion having complementary teeth which engage the first set of slanted teeth disposed inside of the internal channel such that the slidable members are able to slide in one direction only.

Accordingly, it is an object of the present invention to provide a high-mounted brake lamp with a light shield which can be easily installed in a vehicle prior to the installation of the vehicle's rear window. It is also an object of the present invention to provide means to easily and quickly adjust the position of the brake lamp, without the need for installation tooling, to ensure that the light shield is firmly secured against the rear window after the rear window has been installed. These and other objects and advantages of the present invention will become apparent from the following detailed description, the accompanying drawings, and the appended claims.

DETAILED DESCRIPTION OF THE PREFERRED EMBODIMENT

Figure 1:
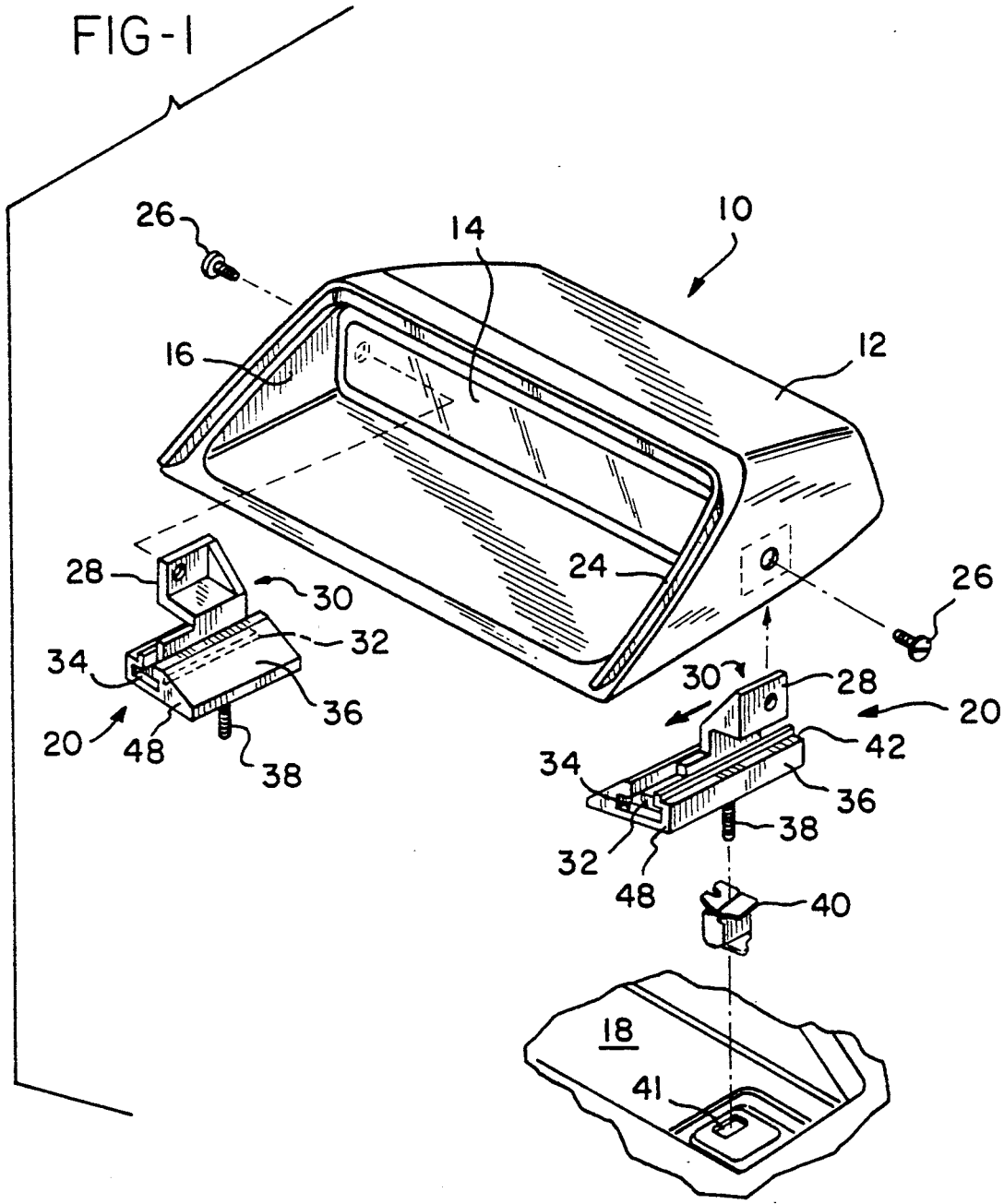
FIG. 1 is an exploded perspective view of the high-mounted brake lamp and mounting assemblies in accordance with the present invention.
Figure 2:
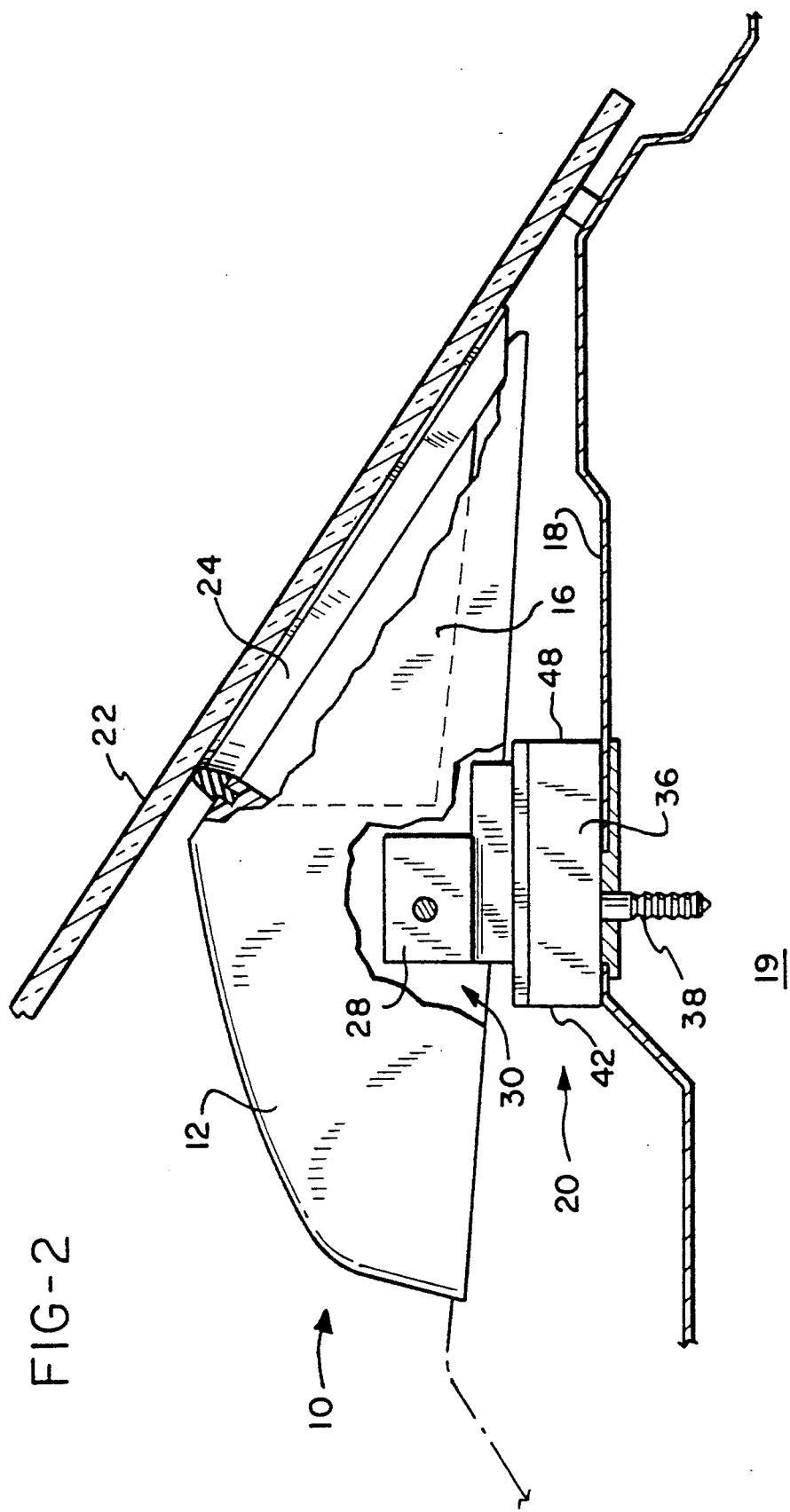
FIG. 2 is a side elevational view of the brake lamp mounted to the package tray of a vehicle and secured against the vehicle's rear window.

Referring now to FIGS. 1 and 2, high-mounted brake lamp 10 generally includes housing 12, light transmissive opening 14, a light source such as a light bulb (not shown) positioned within housing 12 adjacent light transmissive opening 14, and light shield 16 to direct light transmitted from the light source in substantially one direction. Brake lamp 10 is mounted to package tray 18 of vehicle 19 by mounting assemblies 20.

Mounting assemblies 20 provide means for rigidly mounting housing 12 against package tray 18 in a first position prior to attachment of rear window 22 to vehicle 19, and also provide means for securing light shield 16 against rear window 22 after rear window 22 has been attached to the vehicle, by slidably moving housing 12 from its first position, towards rear window 22, and to a second position where light shield 16 is placed into contact with rear window 22 as shown in FIG. 2. Rubber seal 24, which extends around the portion of light shield 16 which contacts rear window 22, provides a tolerance-compensating seal between light shield 16 and rear window 22. As will be explained more fully below, mounting assemblies 20 secure light shield 16 against rear window 22 by providing unidirectional slidability which locks light shield 16 against rear window 22.

Prior to installing brake lamp 10 in vehicle 19, mounting assemblies 20 are affixed to housing 12 by screws 26. Specifically, screws 26 affix housing 12 to first portions 28 of slidable members 30 which have threaded holes to receive screws 26. Slidable members 30 also include second portions 32 which are slidable within internal channels 34 of channel members 36. Channel members 36 and internal channels 34 are oriented substantially parallel to the longitudinal dimension of vehicle 19.

During the assembly of vehicle 19, brake lamp 10 is installed therein prior to the installation of rear window 22. To install brake lamp 10 in vehicle 19, push pins 38, preferably having annular grooves for retention and being affixed to channel members 36, are aligned and inserted into spring nuts 40 (only one of two is shown in FIGS. 1 and 2) and then pushed downwardly to lock housing 12 into a first position. Spring nuts 40 are attached to vehicle 19 prior to the installation of brake lamp 10 in openings 41 (only one shown) in package tray 18. Thus, it is seen that brake lamp 10 can be easily and quickly installed in vehicle 19 without interference from rear window 22 and without the need for installation tooling.

Following the installation of rear window 22 in vehicle 19, brake lamp 10 is adjusted so that light shield 16 is firmly secured against rear window 22, as shown in FIG. 2, so that substantially no light will enter the interior of vehicle 19 This adjustment is effected by manually sliding housing 12 from its first, pre-adjustment and post-installation position in which light shield 16 is not secured against rear window 22, towards rear window 22, and finally to a second position in which light shield 16 is firmly secured against rear window 22. The pre-adjustment position of slidable members 30 with respect to channel members 36 is shown in FIG. 1. The second position is shown in FIG. 2.

As housing 12 is manually pushed towards rear window 22, second portions 32 of slidable members 30 slide in internal channels 34 of channel members 36. When light shield 16 has contacted rear window 22, the aforementioned unidirectional slidability of mounting assemblies 20 prevent second portions 32 from sliding in internal channels 34 in the opposite direction (i.e. away from rear window 22), thereby locking light shield 16 against rear window 22. In this manner, a snug fit between light shield 16 and rear window 22 will be maintained throughout the operational life of vehicle 19. Should the need arise to replace the light source within housing 12, screws 26 may be removed so that housing 12 can be separated from slidable member 30, thus exposing the internal light source. After the light source has been replaced, housing 12 is placed back into position and screws 26 are re-inserted into first portion 28 of slidable member 30.

Figure 3:
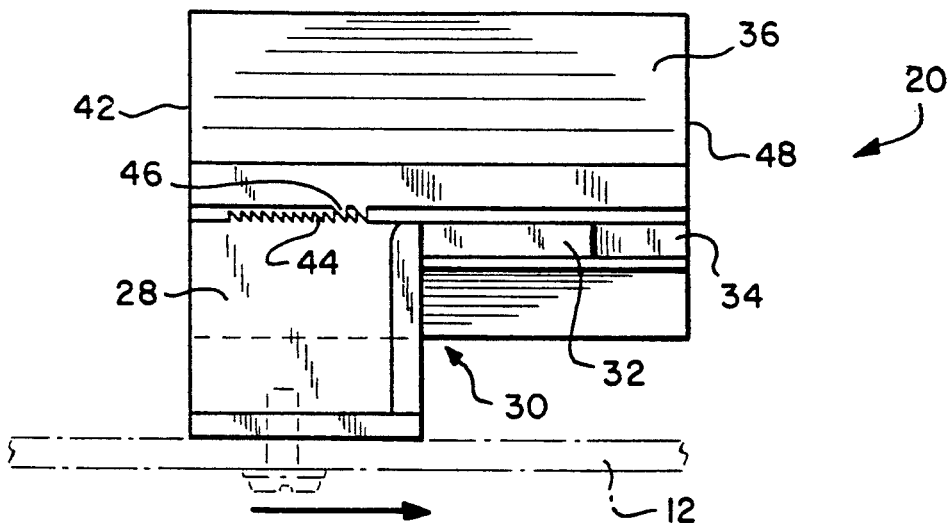
FIG. 3 is a top view of one of the mounting assemblies shown in FIG. 1.
Figure 4:
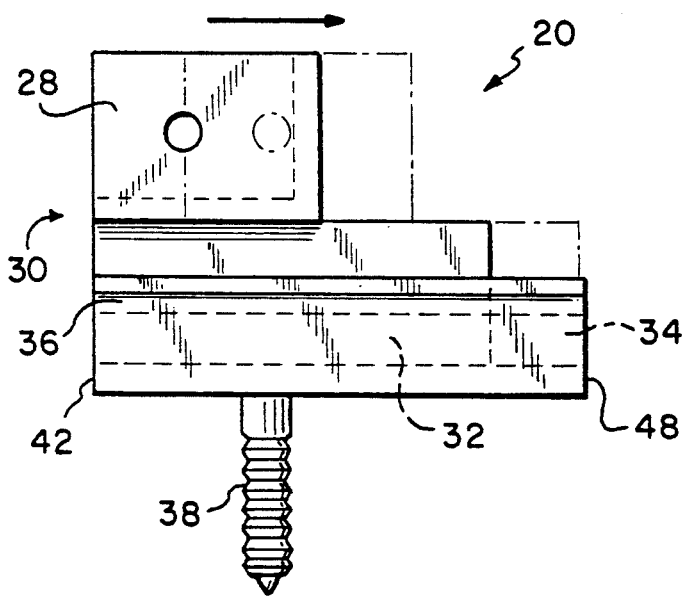
FIG. 4 is a side elevational view of the mounting assembly shown in FIG. 3.
Figure 5:
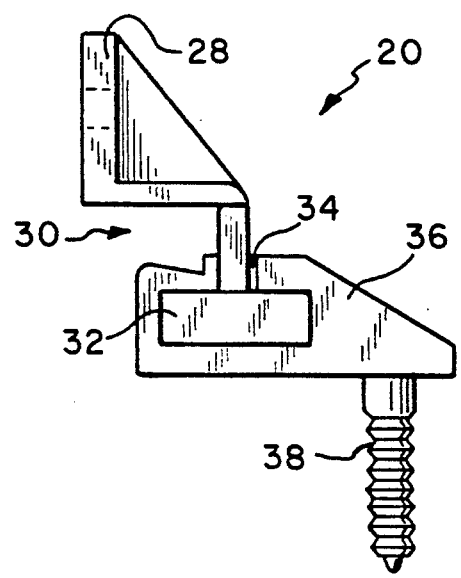
FIG. 5 is a front elevational view of the mounting assembly shown in FIGS. 3 and 4.

With reference now to FIGS. 3-5, the functional details of mounting assemblies 20 will be explained in greater detail. When brake lamp 10 is initially installed in vehicle 19, housing 12 is in a first, pre-adjustment and post-installation position in which light shield 16 is spaced away from where rear window 22 will be installed. As regards mounting assemblies 20, this first position is illustrated in FIGS. 3 and 4 where slidable member 30 is shown at the end 42 of channel member 36 which is farthest away from rear window 22. In this first position, only the first few slanted teeth 44, attached to second portion 32 of slidable member 30, are engaged with corresponding slanted teeth 46, mounted to internal channel 34 of channel member 36. The ratchet assembly shown in FIG. 3 thus serves to interlock the movement of slidable member 30 with channel member 36. In this manner, brake lamp 10 is held clear of rear window 22 during the installation into vehicle 19, and at the same time, since the first few slanted teeth 44 are engaged with slanted teeth 46, housing 12 is rigidly mounted to vehicle 19 so that further assembly of vehicle 19 can take place without concern that brake lamp 10 will become dislodged from its first position. Thus, when rear window 22 has been installed, brake lamp 10 will be in position to be slidably moved from its first position to its second position.

When brake lamp 10 is moved from its first to its second position, slidable member 30 slides towards the end 48 of channel member 36 which is closest to rear window 22, as shown in phantom in FIG. 4. Once light shield 16 has made contact with rear window 22 and is firmly secured thereagainst, slidable member 30 will no longer be able to be slidably moved towards rear window 22. At this point, light shield 16 will be locked into this position against rear window 22 by virtue of the direction of the slant of corresponding slanted teeth 44 and 46. When slidable member 30 moves in the direction of the arrow as shown in FIG. 3, the slanted edges of both sets of slanted teeth 44 and 46 slide past one another and allow slidable member 30 to move. However, slidable member 30 cannot move in a direction opposite that of the arrow in FIG. 3 because the non-slanted edges of slanted teeth 44 and 46 cannot slide past one another. Thus, when light shield 16 is pressed firmly into contact with rear window 22 and then released, the corresponding non-slanted edges of slanted teeth 44 and 46 will ensure that light shield 16 is maintained in that position. In this manner, brake lamp 10 can be easily and quickly adjusted into its proper position following the installation of rear window 22 without interference from rear window 22 and without the need for any installation tooling.

The preferred material from which mounting assemblies are constructed is nylon 6 which can be molded into the parts forming the mounting assembly. As an alternative to having the two mounting assemblies as described above, a single mounting assembly located in the center of housing 12 may be used.

While representative embodiments and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. A high-mounted brake lamp for a motor vehicle having a package tray in the interior of said vehicle and a rear window adjacent said package tray, said brake lamp comprising:
   a lamp housing containing a light transmission opening through which a light source can transmit light, said light source being positioned substantially adjacent said opening;
   a light shield mounted around said opening so as to direct light transmitted from said light source in substantially one direction;
   means for rigidly mounting said housing against said package tray of said vehicle in a first position prior to attachment of said rear window to said vehicle said first position being recessed from said rear window when said rear window is installed; and
   means for securing said light shield against said rear window after said rear window has been attached to said vehicle, by slidably moving said housing from said first position, towards said rear window, and to a second position where said light shield is placed into contact with said rear window, said securing means including an unidirectional slidable portion for locking said light shield against said rear window.

2. The brake lamp of claim 1 wherein said unidirectional slidable portion of said securing means comprises a ratchet mechanism.

3. The brake lamp of claim 2 wherein said mounting means includes an internal channel adapted to accommodate said unidirectional slidable portion.

4. The brake lamp of claim 3 wherein said internal channel is oriented substantially parallel to the longitudinal dimension of said vehicle.

5. The brake lamp of claim 1 wherein:
   said mounting means comprise a pair of channel members mounted to said package tray, said channel members having an internal channel with a first set of slanted teeth disposed inside of said internal channel; and
   said securing means comprise a pair of slidable members, said slidable members having a first portion secured to said housing, and a second portion adapted to slide within said internal channel of said channel members, said second portion having complementary slanted teeth which engage said first set of slanted teeth disposed inside of said internal channel such that said slidable members are able to slide in one direction only, and are prevented from sliding in the opposite direction.

6. A high-mounted brake lamp for a motor vehicle having a package tray in the interior of said vehicle and a rear window adjacent said package tray, said brake lamp comprising:
   a lamp housing having a base portion adjacent said package tray and alight transmissive opening through which a light source can transmit light, said light source being positioned substantially adjacent said opening:
   a light shield mounted around said opening so as to direct light transmitted from said light source in substantially one direction; and
   a mounting assembly affixed to said base portion of said housing, said mounting assembly having a slidable member secured to said base portion of said housing and a channel member for attaching said housing to said package tray of said vehicle, said mounting assembly including a ratchet mechanism which interlocks said slidable member with said channel member to rigidly position, prior to installation of said rear window, said light housing in a first position recessed from said rear window and to provide slidable movement of said light housing, after installation of said rear window, such that said light shield is secured against said rear window.

7. The brake lamp of claim 6 wherein said channel member has an internal channel and said ratchet mechanism includes a first set of slanted teeth disposed inside of said internal channel and complementary slanted teeth mounted on said slidable member, said slidable member being unidirectionally slidable inside of said internal channel.

8. The brake lamp of claim 7 wherein said internal channel is oriented substantially parallel to the longitudinal dimension of said vehicle.

9. A high-mounted brake lamp for a motor vehicle having a package tray in the interior of said vehicle and a rear window adjacent said package tray, said brake lamp comprising:
   a lamp housing having a base portion adjacent said package tray and a light transmissive opening through which a light source can transmit light, said light source being positioned substantially adjacent said opening;
   a light shield mounted around said opening so as to direct light transmitted from said light source in substantially one direction;
   a pair of slidable members affixed to said base portion of said housing, said slidable members having a first portion secured to said base portion of said housing and a second portion having slanted teeth attached thereto; and
   a pair of channel members attached to said package tray for allowing said housing to be mounted to said package tray prior to attachment of said rear window to said vehicle, said channel members having an internal channel with a first set of slanted teeth disposed therein, said second portion of said slidable members being slidable within said internal channel such that said first set of slanted teeth disposed in said internal channel engage said slanted teeth attached to said second portion of said slidable members to allow said second portion to slide within said internal channel in one direction only, whereby, after said rear window has been attached to said vehicle, said housing can be slidably moved towards said rear window until said light shield comes into contact therewith, said slanted teeth disposed in said internal channel and said slanted teeth attached to said second portion of said slidable members corresponding to prevent said light shield from slidably moving out of contact with said rear window.

* * * * *

UNITED STATES PATENT AND TRADEMARK OFFICE
CERTIFICATE OF CORRECTION

PATENT NO. : 5,243,502
DATED : September 7, 1993
INVENTOR(S) : Michael R. Cappuccitti et al It is certified that error appears in the above-indentified patent and that said Letters Patent is hereby corrected as shown below:

Column 5, line 11, "light transmission" should be --light transmissive--.

Signed and Sealed this

Twenty-sixth Day of April, 1994

Attest:

BRUCE LEHMAN

Attesting Officer

Commissioner of Patents and Trademarks